Patented Nov. 13, 1928.

1,691,538

UNITED STATES PATENT OFFICE.

FRANK J. ANDRESS, OF CINCINNATI, OHIO, ASSIGNOR, BY MESNE ASSIGNMENTS, TO THE BROWNIE CORPORATION, OF NEW YORK, N. Y., A CORPORATION OF DELAWARE.

PROCESS OF PRESERVING BEVERAGES.

No Drawing. Application filed May 16, 1925. Serial No. 30,879.

My invention relates to a process for preserving food and beverage products and is particularly directed to the treatment of beverages having milk as one of the components.

By this process, milk and flavoring substances, such as chocolate, sugar, nectar, etc., alone or combined can be bottled and stored over long periods of time, under adverse conditions without spoiling.

In Patent No. 1,497,657, June 10, 1924, granted to me for process of sterilizing food and beverage products, is set forth a treatment for milk beverages, wherein hydrogen peroxide is utilized to destroy the bacterial organisms present in the milk. The process described in this patent is adequate for the sterilization of milk under all normal conditions and also for the sterilization of milk beverages or syrups. The latter, however, may contain proteins or carbohydrates of a nature often present in flavoring matter, such as chocolate or cocoa which may tend to separate under some unfavorable conditions. I have disovered that the reason for this separation is the trace of acid which may result either from the hydrogen peroxide treatment or which may be naturally present in the substances.

One object of my invention is to provide a process for sterilizing food and beverage products so that they will remain intact for protracted periods of time under conditions normally favorable to their decomposition.

Another object of my invention is to provide a process for rendering inactive any acids which may result from the hydrogen peroxide sterilization of a milk beverage or may be naturally present therein without injuring the taste of the beverage or rendering it unfit for human consumption.

As described in my former patent, hydrogen peroxide 3° O. S. P. 56–160 cubic centimeters per gallon is added slowly to the beverage to be sterilized accompanied by agitation to prevent any undue local concentration. During the treatment the beverage is maintained at a heat of approximately 140° F. for a period of approximately half an hour.

The time and temperatures may be slightly varied without changing the result, provided they are varied in the proper relationship. Hydrogen peroxide does not become active as a germicidal agent until a temperature of 100° F. is reached. It enters into a more active state at about 128° F. and will remain active as the temperature is increased until such a temperature is reached that it is decomposed before having an opportunity to act upon the bacterial organisms present. However, high temperatures tend to scorch, char, or burn some of the organic matter, notably some of the sugars present in the beverages. The higher the temperature the shorter is the required period of treatment, but the higher the temperature and the longer the period of treatment the more danger there is of damaging the taste of the resulting product.

Moreover, the hazard of charring, burning or cooking the organic matter depends to a certain extent on the concentration of this organic matter in the beverage. The smaller the concentration of organic matter the less is the danger of this scorching.

It will be seen from the foregoing discussion that some variation of the conditions of treatment is possible depending to a great extent upon the particular materials of which the beverage is composed. The above mentioned 140° F. for a period of approximately a half hour, is favorable for the sterilization of ordinary cow's milk during the summer months when the cows are in the pastures. The above discussion also contemplates the heating treatment to be carried on under atmospheric pressures, greater temperatures being possible when the operation is carried on under greater pressures.

This hydrogen peroxide treatment often leaves traces of acidity in the beverage; also enzymes often present in flavoring matter such as cocoa tend to produce an acid condition. Under many conditions the product will not be adversely affected by this acidity. However, in commercial practice certain organic materials, such as carbohydrates or proteins are often present which tend to separate from the mass in the presence of acid under unfavorable conditions, such as long standing and high temperatures.

Treatment to substantially neutralize this acidity without injuring the qualities of the beverage, is the more specific problem to which this invention is directed. To accomplish this neutralization certain agents known as acid neutralizers or buffers, are employed. Considerable range of choice is possible, most alkali hydroxides, sodium carbonate, sodium phosphate and their equivalents being in general, suitable reagents to enter into the necessary chemical reaction. However, sodium hydroxide is preferred because the resulting salt and the other products and remnants of the reaction are not present in a quantity sufficient to injure the beverage either as to taste or its effect on the human system.

In practice the degree of acidity of the beverage after the hydrogen peroxide treatment is determined by titration and from the results of this test the correct amount of alkali is determined by reference to the atomic weights. The alkali is then stirred into the beverage. The sodium hydroxide destroys or causes to be destroyed any remaining traces of hydrogen peroxide which might result from the use of a large quantity or imperfect decomposition and tends to hold the solid matters present in more perfect suspension. The resulting product will remain homogeneous under the most unfavorable conditions over protracted periods and is commercially adapted for use as pop to be bottled, shipped and sold.

Having described my invention, I claim:

1. The process of preparing milk and flavoring beverage substances of the class described comprising the steps of treating the same with hydrogen peroxide at temperatures at which the same is active as a germicidal agent, but at temperatures below which the beverage is injuriously affected, determining the acidity of the resulting product and adding an innocuous acid neutralizing agent in sufficient quantity to eliminate the acidity.

2. The process of preparing milk and flavoring substances of the class described comprising the steps of treating the same with hydrogen peroxide at temperatures at which the same is active as a germicidal agent, but at temperatures below which the beverage is injuriously affected, and adding sodium hydroxide in sufficient quantity to eliminate the acidity of the beverage.

In witness whereof, I hereunto subscribe my name.

FRANK J. ANDRESS.